June 2, 1953  R. F. HEINJE  2,640,566
SUPPORTING MEANS FOR SWINGABLE MATERIAL HANDLING DUCTS
Filed Feb. 1, 1950  2 Sheets-Sheet 1

INVENTOR.
R. F. HEINJE
BY
ATTORNEYS

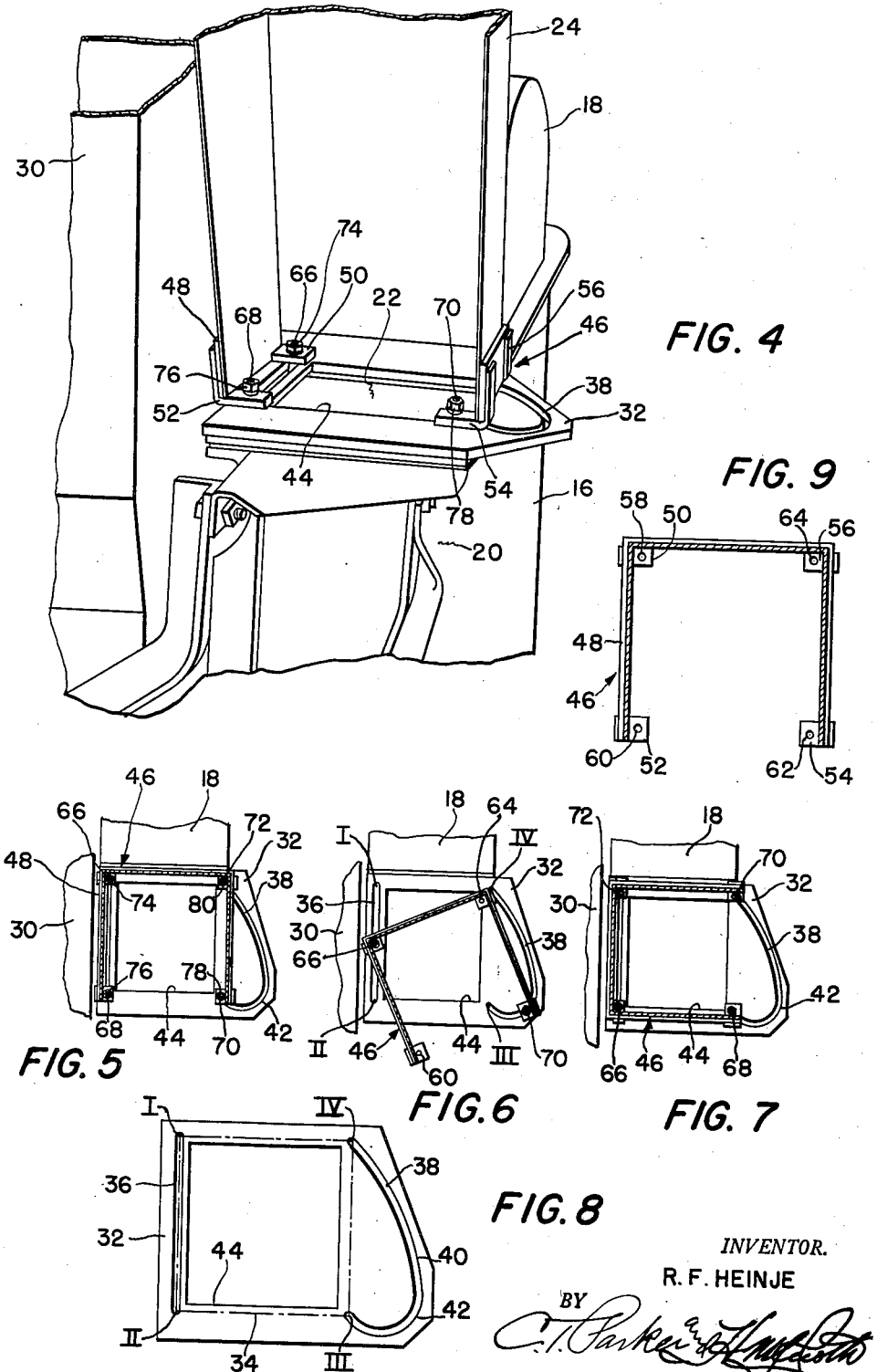

Patented June 2, 1953

2,640,566

UNITED STATES PATENT OFFICE 2,640,566

SUPPORTING MEANS FOR SWINGABLE MATERIAL HANDLING DUCTS

Robert F. Heinje, Ottumwa, Iowa, assignor to Deere Manufacturing Co., Dubuque, Iowa, a corporation of Iowa Application February 1, 1950, Serial No. 141,807

6 Claims. (Cl. 189—36)

This invention relates to adjustable supporting structure in general and more particularly relates to such structure for use in mounting of an adjustable material-handling duct or spout of the kind commonly found on agricultural machines of the crop-comminuting type.

One example of such machine is the ensilage harvester which has means for gathering crops and means for conveying these crops to a comminuting housing from which the reduced crops are discharged to a trailing wagon or other receptacle. The reducing housing is generally circular but at one side thereof has an upwardly directed tangential discharge portion having an upper terminal part to which is swingably mounted a discharge duct or spout for effecting the transfer of reduced crops to the wagon or other receptacle. The discharge spout curves upwardly and outwardly relative to the housing and is swingably mounted for angular positioning about a substantially vertical axis so that the discharge end thereof may be positioned selectively to the rear or to one side of the housing, whereby crop discharge may be effected into a wagon trailing behind the machine or drawn alongside the machine.

Normally, such discharge spout is of circular cross section and the swivel mounting thereof to the housing presents no particular problem. In some cases, however, it is desired, for various reasons, to construct the discharge spout such that it is square in cross section with one side thereof open, as in U. S. Patent 2,431,477. In a design of this type, the parts comprising the swivel mounting necessarily are non-circular and this characteristic complicates somewhat the changing of the discharge spout from a side to a rear position or vice versa. In the past, the change has been accomplished only by completely removing the spout and reassembling it in its new position. According to the present invention, improved supporting or mounting means has been provided which enables positioning of the discharge spout without removal thereof from the reducing housing.

The principal object of the invention, therefore, resides in the provision of improved means for facilitating the positioning of a discharge spout of the character described. Another object of the invention is to provide a mounting that is relatively inexpensive, one that can be adapted to existing machines of certain types, and one that may be easily and simply handled by one man. A further object of the invention is to provide the supporting means in the form of a pair of cooperating plate-like structures having cooperating apertures and slots and a plurality of securing means such as bolts, certain of which can be removed and others of which need only be loosened in making the change of the spout from one position to another.

The foregoing and other important objects and desirable features inherent in and encompassed by the invention will become apparent from the following detailed description and accompanying sheets of drawings which disclose a preferred embodiment of the invention.

In the drawings:

Figure 4 is an enlarged fragmentary perspective view showing the mounting structure;

Figures 5, 6 and 7 are views showing various stages of the parts during the change of the spout from one position to another;

Figure 8 is a top plan view of the base or mounting plate per se; and

Figure 9 is a sectional view, as seen from above, of the lower portion of the supported element or discharge spout, detached from the base or mounting plate structure.

Figure 1:
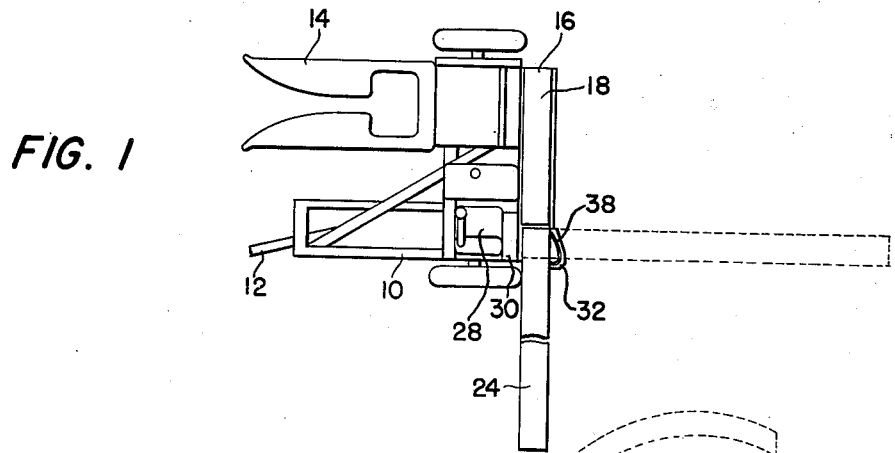
Figures 1, 2 and 3 are respectively top plan and side and rear elevational views of one type of ensilage harvester to which the invention may be applied.
Figure 2:
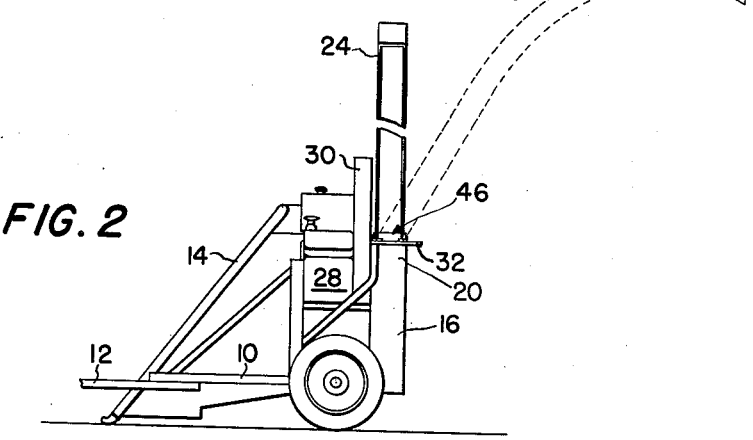
Figure 3:
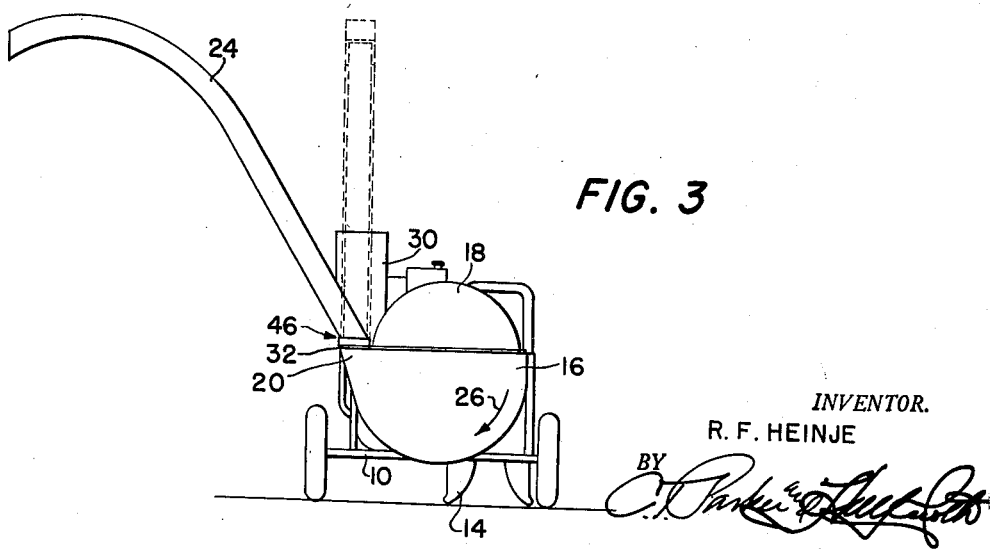

As shown in Figures 1, 2 and 3, the ensilage harvester chosen for the purposes of illustration comprises a mobile frame 10 having a forwardly extending hitch 12 by means of which the machine may be connected to a tractor or other propelling source for travel over a field of crops to gather standing stalks and like crops in the throat of a gathering unit 14. The mobile frame 10 carries at the rear thereof behind the gathering unit 14 a crop-comminuting or reducing housing 16 which, with its cover 18, is of generally circular form (Figure 3). This housing is provided at one side thereof with an upwardly directed tangential portion 20 which terminates at its upper end to provide a crop-discharge opening 22 (Figure 4) in communication with a crop-discharge duct or spout 24.

Since the fundamental details of construction and operation of the machine form no part of the present invention and may be generally conventional, familiarity therewith will be assumed. It will be understood, of course, that a rotor or the like (not shown) rotates in a direction of the arrow 26 in Figure 3 to effect discharge of the reduced crop through the discharge opening 22 and upwardly and outwardly through the duct or spout 24. It will be noted that the spout is substantially square in cross section and that its underside is omitted. See U. S. Patent 2,431,477, referred to above.

In a typical crop-gathering and reducing operation, the machine will be drawn forwardly over the field and a wagon will be trailed directly behind the machine or at the left-hand side thereof. Figures 1–3 show in full lines the lateral position of the discharge spout and in dotted lines show the rearward position of the spout.

The ensilage machine shown is of the type equipped with its own power plant; that is, the machine is propelled by a tractor or other draft source but has its own power plant for operating the gathering unit and the comminuting means within the housing 16. The power plant is here shown as an internal combustion engine designated generally by the numeral 28. This engine is located to the left of the gatherer unit 14 and ahead of the left-hand portion of the housing 16. The engine is provided with an upstanding air intake duct 30. It will be seen that the housing-proximate end of the discharge spout 24 is relatively closely confined at its front and right-hand sides by the air intake duct 30 and proximate portion of the housing cover 18. It is this relationship of components that complicates somewhat the swivel mounting of the spout on the housing so that the former may have the two positions referred to above.

According to the present invention, there is provided improved mounting or supporting structure for connecting the spout 24 to the housing 18 so that the two necessary positions may be easily obtained without requiring disassembly and reassembly each time a new position is desired. For this purpose, the discharge portion 20 is provided at its upper terminal edges with a base or supporting element in the form of a first plate 32, shown by itself in Figure 8. The details of the mounting of this plate on the housing 16 can best be seen in Figure 4.

This plate is disposed substantially horizontally and has an upper generally flat mounting or carrying surface the area of which includes an imaginary square, indicated at 34 in Figure 8. For purposes of further identification, the square has its four corners numbered consecutively by the Roman numerals I, II, III and IV.

The plate 32 has means providing therein an elongated straight track or guide in the form of a slot 36 extending between and having opposite terminal ends respectively at the corners I and II. This slot lies, of course, along one edge or side of the square 34.

The plate 32 has additional means providing therein a second slot 38 extending between and having opposite terminal ends respectively at the corners III and IV. That portion of the slot 38 extending from the corner IV to a point designated in Figure 8 by the numeral 40 is an arc having the corner II as its center. This arcuate portion of the slot is joined by a contiguous slot portion 42 to the terminal end portion at corner III. This slot portion 42 is not critical but is preferably shaped as shown so that the slots may be confined within a plate generally of the size and configuration illustrated. The reasons for the particular configuration of the slots will be brought out below in connection with a description of the positioning of the discharge spout 24.

The plate 32 has a central opening 44 which is square to conform to the discharge opening 22 in the discharge portion 20 of the housing 16.

The lower end of the discharge spout 24—that is, the end that mounts on the plate 32—is provided with a second or supported element made up of a plurality of parts forming a second plate. For the purposes of further identification, the lower end of the discharge spout and associated second plate structure will be indicated generally by the numeral 46. This is shown by itself in Figure 9.

As previously stated, the discharge spout 24 has three sides corresponding respectively to three sides of a square, one of the sides being omitted so that the bottom of the spout is open. Surrounding these three sides is a steel reenforcing strip 48. The square formation of the element 46 is substantially congruent with the square 34; and the element 46 has a plurality of plate portions in the form of lugs numbered consecutively in counterclockwise order by the numerals 50, 52, 54 and 56. Each of these lugs is in the form of an angle having one leg horizontal and its other leg vertical and secured to the strip 48, preferably by welding, the details of which will be generally apparent from an examination of Figure 4. These lugs or plate portions are respectively apertured at 58, 60, 62 and 64 (Figure 9).

When the discharge spout 24 is in its laterally extending position as shown in full lines in the drawings, the plate structure or element 46 is superimposed on and carried by the upper surface of the plate 32 in such position that the plate portions or lugs 50, 52, 54 and 56 are located respectively over the corners I, II, III and IV of the square 34; therefore, the apertures or holes 58 and 60 are respectively at opposite terminal ends of the slot 36 and the holes or apertures 62 and 64 are respectively at opposite terminal ends of the curved slot 38.

As previously stated, the slots 36 and 38 provide tracks or guides. The supported element 46 is provided with a plurality of means, certain of which serve as track or guide followers and certain of which serve as releasable securing means for fixing the position of the spout on the housing 16. For the purposes of clarity in further description, each of these means will be separately identified; although, in the preferred construction, each means is identical with the others and each takes the form of a threaded bolt and cooperating nut. Referring now to Figures 4 and 5, it will be seen that the element 46 is secured to the plate 32 by four means as follows: A plurality of bolts 66, 68, 70 and 72 located respectively at the corners I, II, III and IV and at the lug or plate portions 50, 52, 54 and 56; these bolts are provided respectively with nuts 74, 76, 78 and 80. The bolt 66 is passed through the aperture 58 in the lug 50 and through the terminal end portion of the slot 36 at corner I. The nut 74 is threaded on the bolt 66 and tightened. The other bolts are respectively passed through the alined apertures and terminal end portions of the associated slots and the respective nuts are tightened thereon to secure the laterally outwardly extending position of the spout 24.

Now, when it is desired to swing the spout to its rearward position, it is necessary only to loosen the diagonally opposite nuts 74 and 78 on the bolts 66 and 70 and to remove the bolt and nut assemblies 68—76 and 72—80. Because of the clearance limitations imposed by the proximity of the housing cover 18 and engine air intake 30, angular positioning of the spout 24 must be effected without movement of the corners of the supported element 46 over the adjoining edges of the plate 32 bounded by the components 18 and 30 (the upper and left-hand edges as viewed in Figures 5, 6 and 7). It is for this reason that the slots 36 and 38 are shaped as illustrated.

The angular positioning of the spout 24 is accomplished by moving the spout through the successive stages indicated in Figures 6 and 7, beginning with the position shown in Figure 5. The loosened bolt 66 serves as a track or guide follower and may move straight along the slot 36 from the corner I to the corner II. Simultaneously, the bolt 70 operates as a follower in moving through the short arcuate portion 42 of the slot 38. It will be noted that the corner in which the bolt 66 is situated does not contact the proximate edge of the air intake housing 30; nor does the corner of the element 46 at which the opening 64 is located contact the proximate surface of the housing cover 18. It will be appreciated that the diagonally opposite corners provided with the apertures or holes 60 and 64 move out of the square, but this is immaterial since sufficient clearance is provided in the zones through which these portions move.

As the corner of the element 46 that carries the loosened bolt 66 progresses to substantially a midpoint of the straight slot 36, the diagonally opposite corner is caused to follow the arcuate portion 42 of the slot 38 because of the loosened bolt 70. The corner carrying the bolt 66 can then be moved to the end at corner II of the slot 36 and, since the arcuate portion of the slot 38 is formed as an arc with the corner II as a center, the corner of the element 46 carrying the bolt 70 may be swung up to corner IV. Since the components are based on a perfect square, the opening 64 now becomes alined with the terminal end of the slot 36 at I and the corner having the opening 60 now becomes alined with the terminal end of the slot 38 at II. The removed bolts 68 and 72 and their nuts 76 and 80 may be replaced and tightened; the nuts on the bolts 66 and 70 are tightened and the spout is secured in its rearwardly directed position.

Return of the spout from its rearwardly directed position to its laterally directed position may be just as simply accomplished. In either case, all that is necessary is the removal of the bolts and nuts 68—76 and 72—80 and loosening of the nuts 74—78, until the new position has been achieved, after which the removed bolts are replaced and all the nuts are tightened to secure the new position.

It will be seen from the foregoing disclosure that the supporting structure is relatively simple and adequately accommodates the adjustment of the spout 24 from one position to another. It will be appreciated, of course, that the particular illustration is representative only, since the supporting structure or the equivalent based thereon can be just as readily used in similar situations. Other features and advantages of the invention not specifically enumerated will undoubtedly occur to those versed in the art, as will numerous modifications and alterations in the preferred embodiment of the invention disclosed, all of which may be achieved without departing from the spirit and scope of the invention as defined in the appended claims.

What is claimed is:

1. In a structure of the character described: a first element; a substantially straight guide on said element having first and second spaced apart terminal ends; a curved guide on said element substantially coplanar with the straight guide and having first and second opposite ends lying on a line parallel to the straight guide and spaced from said straight guide a distance equal to the length of said straight guide; said first and second terminal ends of the curved guide being respectively directly opposite the first and second terminal ends of the straight guide so that said first terminal ends lie on a first line normal to the straight guide and said second terminal ends lie on a second line normal to said straight guide; said curved guide including a portion formed as an arc extending from its first terminal end toward its second terminal end and having as its center the second terminal end of the straight guide, and further including a contiguous portion connecting said arc portion to the second terminal end of said curved guide; a second element superimposed on the first element and a pair of guide followers fixed to the second element in spaced apart location thereon corresponding respectively to diagonally opposite terminal ends of the guides and slidably received respectively by the guides to interconnect the elements for relative angular movement in the plane of said surface of the first element, one follower being slidable along the straight guide in one direction and the other follower being simultaneously slidable in the opposite direction along the curved guide.

2. The invention defined in claim 1, further characterized in that: each guide follower includes releasable means operative to secure selected positions of the second element relative to the first element.

3. The invention defined in claim 1, further characterized in that: the second element includes a pair of releasable means operative to secure selected positions of the second element relative to the first element, said means being located on the second element in such positions as to be initially received respectively by the guide means at the other diagonally opposite terminal ends thereof.

4. The invention defined in claim 1, further characterized in that: the first element is in the form of a plate; the guides are slots therethrough; the second element is in the form of a plate; and each guide follower includes an aperture in the second element, alined with the aforesaid terminal end of the respective guide, and a threaded connecting bolt passed through said aperture and respective slot and having a nut threaded thereon.

5. The invention defined in claim 4, further characterized in that: the second element is additionally provided with a pair of apertures initially alinable with the other diagonally opposite ends of the guide slots; and a second pair of threaded bolt and nut assemblies is provided, one for each additional aperture and associated terminal end, each of said second bolts being removable to provide for angular movement of the second element relative to the first to a second position in which the first bolts have moved in their slots respectively to the second and fourth corners, and said second pair of bolts being replaceable at the first and third corners.

6. In a structure of the character described: a supporting element; a substantially straight guide on said element having first and second spaced apart terminal ends; a curved guide on said element substantially coplanar with the straight guide and having first and second opposite ends lying on a line parallel to the straight guide and spaced from said straight guide a distance equal to the length of said straight guide; said first and second terminal ends of the curved guide being respectively directly opposite the first and second terminal ends of the straight guide so that said first terminal ends lie on a first line normal to the straight guide and said second terminal ends lie on a second line normal to said straight guide; and said curved guide including a portion formed as an arc extending from its first terminal end toward its second terminal end and having as its center the second terminal end of the straight guide, and further including a contiguous portion connecting said arc portion to the second terminal end of said curved guide.

ROBERT F. HEINJE.

References Cited in the file of this patent

UNITED STATES PATENTS

| Number | Name | Date |
|---|---|---|
| 582,643 | Harvey | May 18, 1897 |
| 2,431,477 | Hill | Nov. 25, 1947 |